United States Patent [19]

Nakayama

[11] Patent Number: 4,737,041
[45] Date of Patent: Apr. 12, 1988

[54] DOT PRINTING APPARATUS AND METHOD

[75] Inventor: Tetsuroh Nakayama, Mishima, Japan

[73] Assignee: Tokyo Electric Co., Ltd., Tokyo, Japan

[21] Appl. No.: 879,384

[22] Filed: Jun. 27, 1986

[30] Foreign Application Priority Data

Jul. 10, 1985 [JP] Japan .................. 60-152077

[51] Int. Cl.[4] .............................. B41J 3/12
[52] U.S. Cl. ................. 400/121; 346/140 R; 400/126; 364/519
[58] Field of Search ........ 400/121, 124, 126; 101/93.04; 346/140 PD; 364/519

[56] References Cited

U.S. PATENT DOCUMENTS 4,063,254  12/1977  Fox et al.
4,159,882  7/1979  Sanders .................. 400/124
4,232,324  11/1980  Tsao ..................... 346/75
4,401,991  8/1983  Martin .................... 346/75

FOREIGN PATENT DOCUMENTS 90380  7/1980  Japan .................... 400/121

Primary Examiner—Paul T. Sewell
Attorney, Agent, or Firm—Frishauf, Holtz, Goodman & Woodward

[57] ABSTRACT

An ink jet printer feeds recording paper by a predetermined distance DT each time a plurality of dot line data have been printed, by a printing head, for every line. The printing head has n printing elements arranged in a line in the first direction at predetermined regular intervals of P, and prints the dots with a dot pitch of PC, in the first direction. The printing operation is executed so as to satisfy the expression of $P = n \times PC + PC = DT + PC$.

6 Claims, 7 Drawing Sheets

F I G. 1    F I G. 2
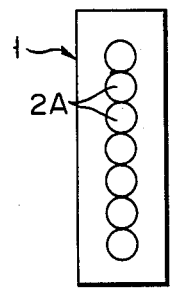
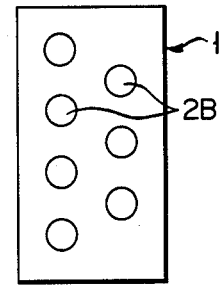
F I G. 3
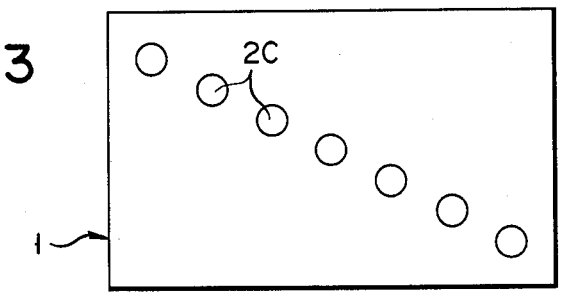
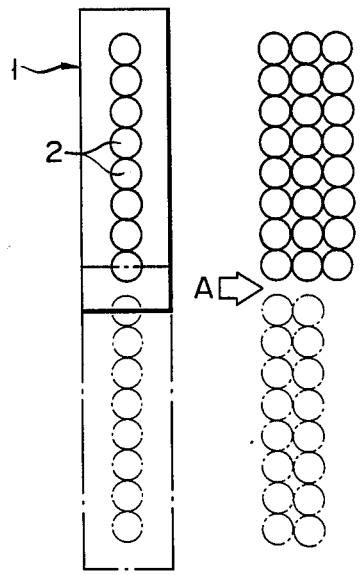
F I G. 4

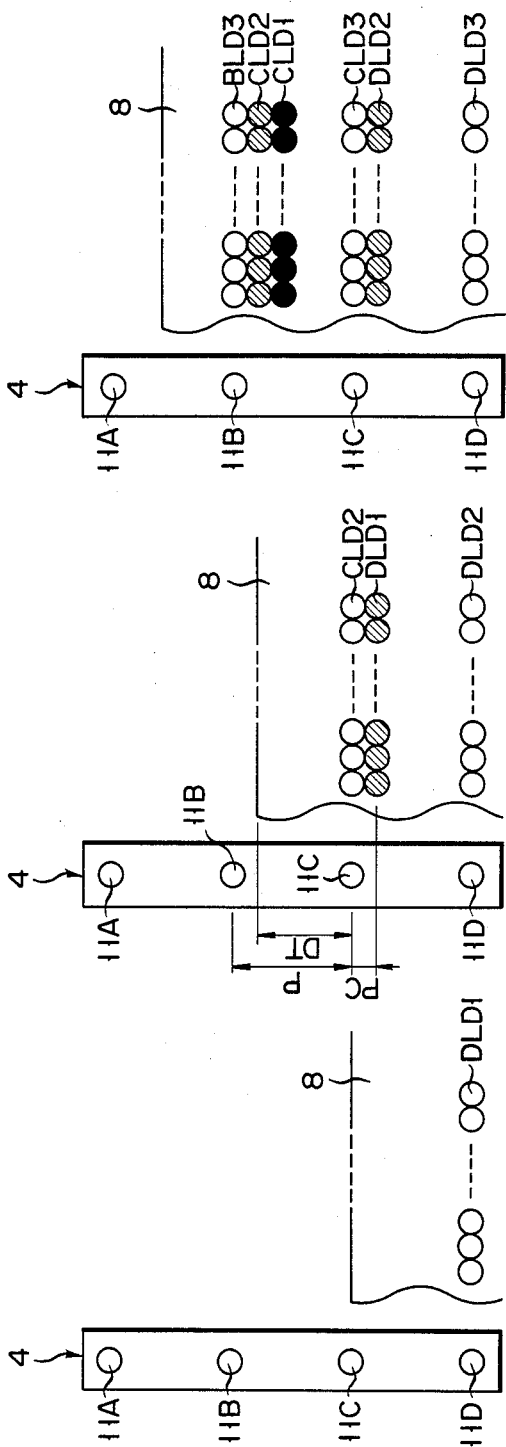

DOT PRINTING APPARATUS AND METHOD

BACKGROUND OF THE INVENTION

The present invention relates to a dot printing apparatus and a method for printing on a recording medium, using a plurality of printing elements.

Hitherto, as shown in FIG. 1, a printing head 1, in a dot printer equipped with a plurality of printing elements, is constituted such that a plurality of printing elements 2A are arranged in a line, in contact with one another in the sub-scanning (vertical) direction. Such a structure can be realized in some types of printer, such as a wire dot printer. However, in the printing head of an ink jet printer, the printing elements cannot be arranged in contact with one another, since a relatively large space needs to be provided around each printing element. Therefore, printing elements 2B are arranged in a zigzag form as shown in FIG. 2, or printing elements 2C are arranged on an oblique line as shown in FIG. 3.

In any of those types, as shown in FIG. 4, each time printing head 1 is driven in the main scanning (horizontal) direction to print one line of character data, the recording medium is moved upward in the sub-scanning direction by a distance equal to the dimension (in the sub-scanning direction) of the array of printing elements 2.

In the case where the space occupied by each printing element is large, as in an ink jet printer, the printing elements are arranged as shown in FIGS. 2 or 3; consequently, the width (the dimension in the main scanning direction) of printing head 1 increases. Due to the increase in the width of printing head 1, the distance of movement in the main scanning direction of this printing head 1 must be increased by a distance equal to twice the width in the main scanning direction of the array of the printing elements, so that the whole size of the printer is enlarged. This is the first problem.

With conventional types of printer, the dot pitch (the distance between the centers of two adjacent dots) in the sub-scanning direction cannot be made shorter than the interval of the printing elements. This is the second problem.

Further, as shown in FIG. 4, if the pitch in the sub-scanning direction of printing head 1 is set larger than the dimension (in the sub-scanning direction) of the whole length of printing elements 2, when the dots are printed by activating all of the printing elements, a white line will be produced in a boundary portion A of the adjacent main scanning regions. On the other hand, in the case where the pitch in the sub-scanning direction of printing head 1 is set smaller than the dimension (in the sub-scanning direction) of whole printing elements 2, a darker black line will be formed in the boundary portion. This is the third problem.

SUMMARY OF THE INVENTION

It is the object of the present invention to provide a dot printing apparatus and method which can execute dense printing by a plurality of printing elements arranged substantially in a line.

This object is accomplished by a dot printing apparatus comprising: a printing head having n printing elements arranged in a line in the first direction at regular intervals of P ($=n \times PC + PC$) (PC is the pitch of dots to be printed in the first direction) and serving to print dots onto recording paper; a head driver for driving the printing head in the second direction, perpendicular to the first direction; a paper feeder for feeding the recording paper in the first direction by a distance DT ($=n \times PC$) with respect to the printing head for every printing cycle; a memory including a plurality of row address locations for storing M dot line data; and a control unit for selectively energizing those n printing elements in each printing cycle, on the basis of the dot line data from predetermined n row address locations in this memory, and shifting these M dot line data in one direction by an amount of n row address locations with respect to the row address locations.

On the other hand, the above object is accomplished by a dot printing method comprising the steps of: moving a printing head having n printing elements arranged substantially in a line, in the first direction, at regular intervals of P ($=n \times PC + PC$) (PC denotes the pitch of dots to be printed in the first direction), in the second direction perpendicular to the first direction, while energizing those n printing elements in each printing cycle, on the basis of the dot line data from predetermined n row address locations in a memory having the first to M-th row address locations, in which M dot line data have been stored; feeding recording paper by a distance DT ($=n \times PC$) along the first direction with respect to the printing head in each printing cycle; and shifting the M dot line data in one direction by an amount of n row address locations, with respect to the first to M-th row address locations in each printing cycle.

In this invention, a plurality of printing elements arranged in a line are used, and the dots can be densely printed onto the recording paper while moving the recording paper by a predetermined distance for the printing elements in each printing cycle.

BRIEF DESCRIPTION OF THE DRAWINGS

FIG. 1 shows an array of printing elements of a conventional wire dot printer;

FIGS. 2 and 3 show arrays of printing elements of the printing heads for use in conventional ink jet printers.

FIG. 4 is an explanatory diagram of the printing operation by a conventional printing head having a plurality of printing elements arranged in a line;

FIGS. 9A to 9E show steps of the printing operation which is executed in accordance with the flowchart shown in FIG. 8.

DETAILED DESCRIPTION OF THE PREFERRED EMBODIMENT

Figure 5:
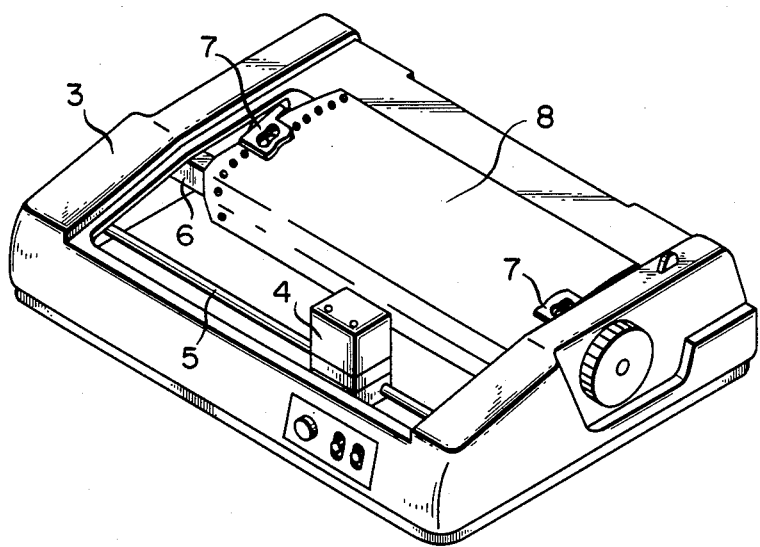
FIG. 5 is a perspective view of an ink jet printer according to an embodiment of the present invention.

FIG. 5 is a perspective view of an ink jet printer according to an embodiment of the present invention. This printer includes a housing 3; a printing head 4 slidably mounted on a guide shaft 5 fixed to housing 3; an opposite electrode 6 arranged to face printing head 4; and a tractor 7 for feeding recording paper 8 set in contact with electrode 6.

Figure 6:
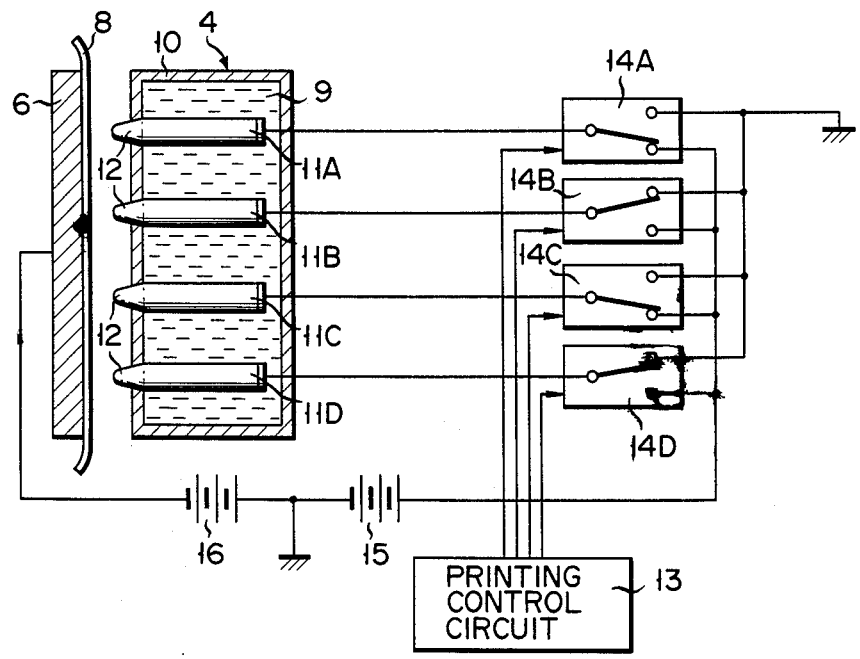
FIG. 6 is a circuit diagram of a printing section of the ink jet printer shown in FIG. 5.

As shown in FIG. 6, printing head 4 has n, for example, four recording electrodes 11A to 11D serving as printing elements in a casing 10, in which ink 9 is filled. Electrodes 11A to 11D are arranged at regular intervals of P and their front edge portions 12 project from casing 10 towards opposite electrode 6. Each of recording electrodes 11A to 11D has ink impregnating ability and electrical conductivity. These electrodes are connected to a power supply 15 through switching elements 14A to 14D, whose operations are controlled by a printing control circuit 13. Another power supply 16 is connected to opposite electrode 6.

Figure 7:
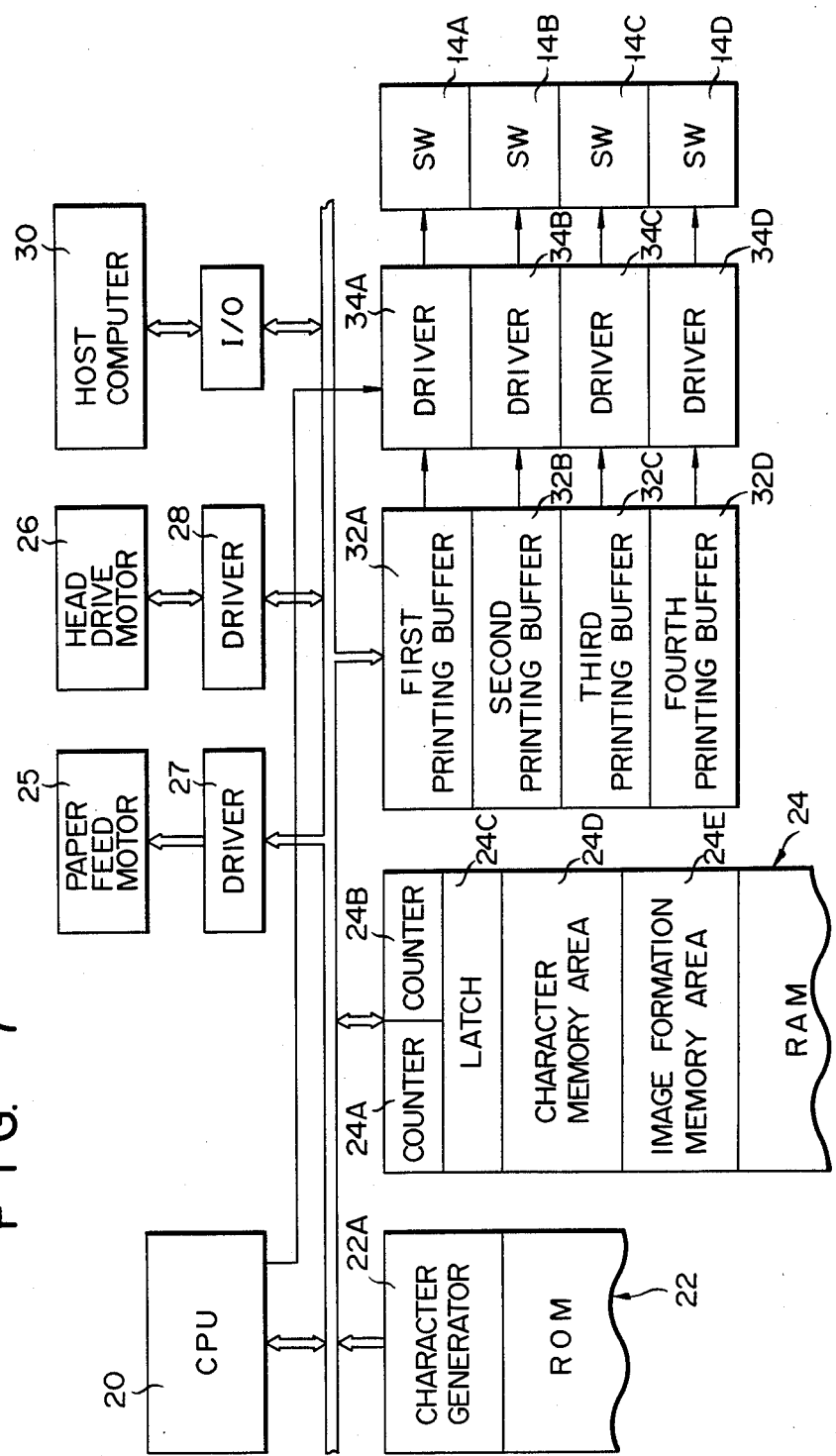
FIG. 7 is a block diagram showing a detailed arrangement of a control circuit shown in FIG. 6.

FIG. 7 is a circuit diagram of printing control circuit 13 shown in FIG. 6. This control circuit includes a CPU 20; a ROM 22 which includes a character generator 22A, for generating character data corresponding to a character code, and in which programs to be executed by CPU 20 are stored; and a RAM 24 including counters 24A and 24B, a latch 24C to latch the character code, a character memory area 24D to store the character data, and an image formation memory area 24E. CPU 20 is connected to a paper feed motor 25 and a head drive motor 26 through drivers 27 and 28, respectively, and is also connected to a host computer 30 through an I/O port. Host computer 30 supplies the character code to CPU 20. CPU 20 is further connected to four printing buffers 32A to 32D. Printing buffers 32A to 32D are connected to switching elements 14A to 14D, shown in FIG. 6, through drivers 34A to 34D, respectively.

In this embodiment, for simplicity of explanation, it is assumed that each column of each character data includes twelve dots (seven dots of dot character data and five space dots), and that character memory area 24D and image formation memory area 24E have twelve and twenty-four row addresses, so that character data of one and two lines can be stored, respectively.

Figure 8:
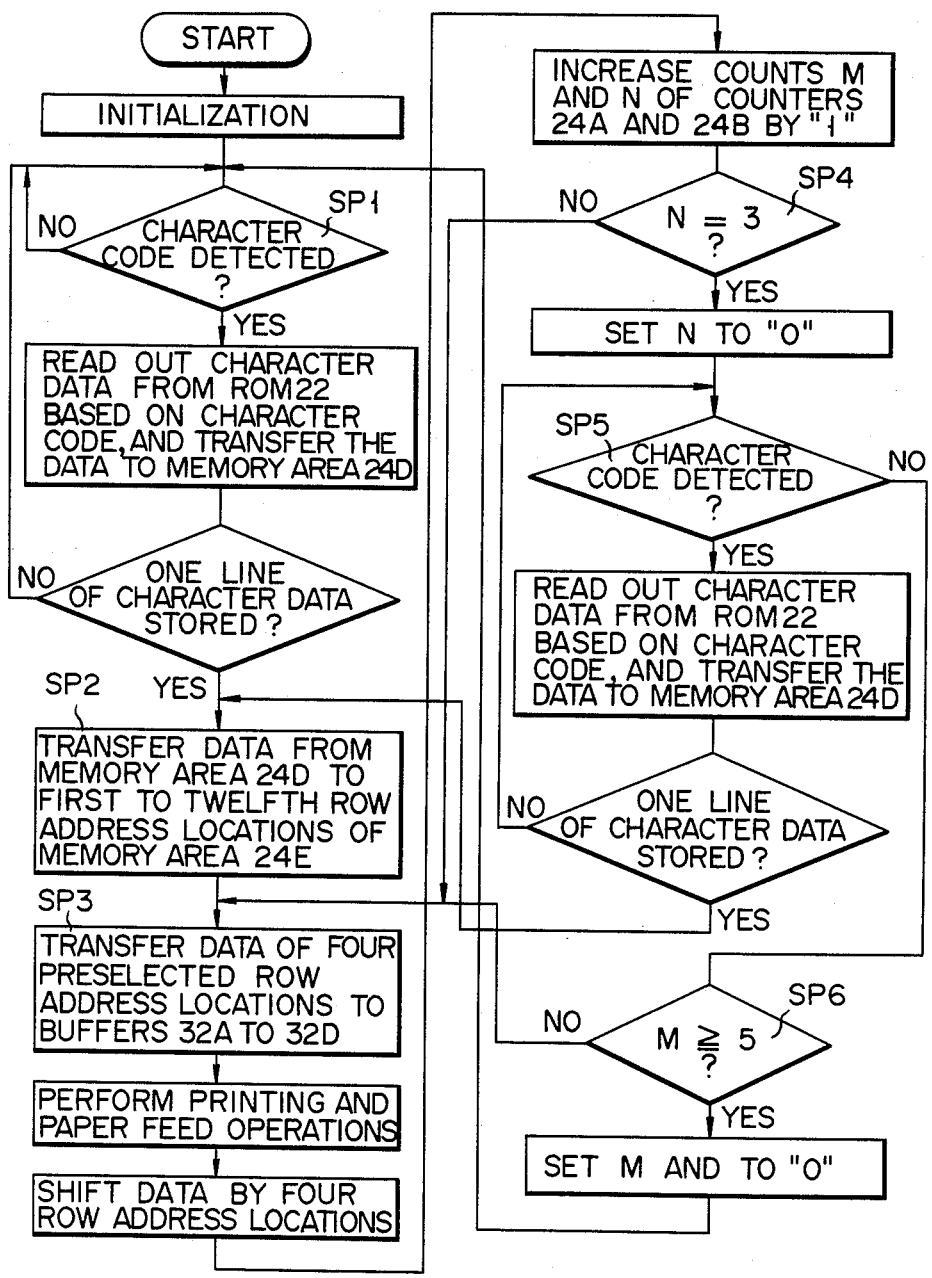
FIG. 8 is a flowchart for explaining the operation of the ink jet printer shown in FIGS. 5 to 7.

The operation of the ink jet printer shown in FIGS. 5 to 7 will now be described below with reference to the flowchart shown in FIG. 8.

First, in the initialization step, the contents of RAM 24 and printing buffers 32A to 32D are cleared. Next, in step SP1, a check is made to see whether or not the character code supplied from host computer 30 has been stored in latch 24C. If YES in step SP1, the dot character data corresponding to this character code is read out of character generator 22A. Each column of dot character data read out from character generator 22A includes seven dots, and five space-dots are added to each column of the dot character data to constitute twelve-dot character data which is then stored in character memory area 24D. This operation is repeatedly executed until the character data of one line is stored in memory area 24D. Thereafter, in step SP2, the character data of one line in memory area 24D is transferred to the first to twelfth row address locations in image formation memory area 24E. In the next step SP3, CPU 20 supplies four dot line data stored in the 9th, 14th, 19th, and 24th row address locations in memory area 24E to printing buffers 32A to 32D, respectively. CPU 20 supplies a drive signal to head drive motor 26 to move the head 4 one step by one in the main scanning direction, while supplying the dot line data stored in printing buffers 32A to 32D to drivers 34A to 34D, for every one-dot data. Drivers 34A to 34D set switching elements 14A to 14D to the first or second switching position, depending on whether the dot data supplied is "0" or "1". When each switching element has been set to the first switching position, it connects a corresponding one of electrodes 11A to 11D to the ground. When each switching element has been set to the second switching position, this allows a positive voltage to be applied to this electrode. Thus, for example, when the corresponding switching element has been set to the second switching position, by the driver which received the dot data of "1", ink is injected from the front edge portion 12 of the corresponding electrode, so that a dot is printed onto recording paper 8.

After all the dot line data in printing buffers 32A to 32D has been printed as described above, recording paper 8 is fed in the sub-scanning direction by a predetermined distance DT. Next, CPU 20 shifts 12 dot line data to the fifth to sixteenth row address locations in image formation memory area 24E.

Next, CPU 20 increases the contents N and M of counters 24A and 24B by "1", and thereafter it checks in step SP4 to see whether or not the content N of counter 24A has become "3". If N is smaller than 3, step SP3 is again executed. If N equals 3, namely, when the character line data at the first to twelfth row address locations has been shifted to the 13th to 24th row address locations, the content of counter 24A is cleared and thereafter, in step SP5, a check is made to see whether or not the character code constituting the next character line has been stored in latch 24C. If YES in step SP5, the dot character data of one line corresponding to the character code or codes stored in latch 24C, is read out of character generator 22A, in a manner similar to the above, and stored in character memory area 24D. Thereafter, CPU 20 executes step SP2 in a manner similar to the above. On the other hand, if NO in step SP5, a check is made in step SP6 to see whether or not the content M of counter 24B is equal to, or larger than "5"; in other words, to see if all of the dot character data which has finally been stored into character memory area 24D has been completely printed or not. If NO in step SP6, step SP3 is executed and the printing operation is continued. On the other hand, if YES in step SP6, step SP1 will be executed again after counters 24A and 24B have been cleared.

The printing operation is now described with reference to FIGS. 9A to 9E and FIG. 10.

Figure 10:
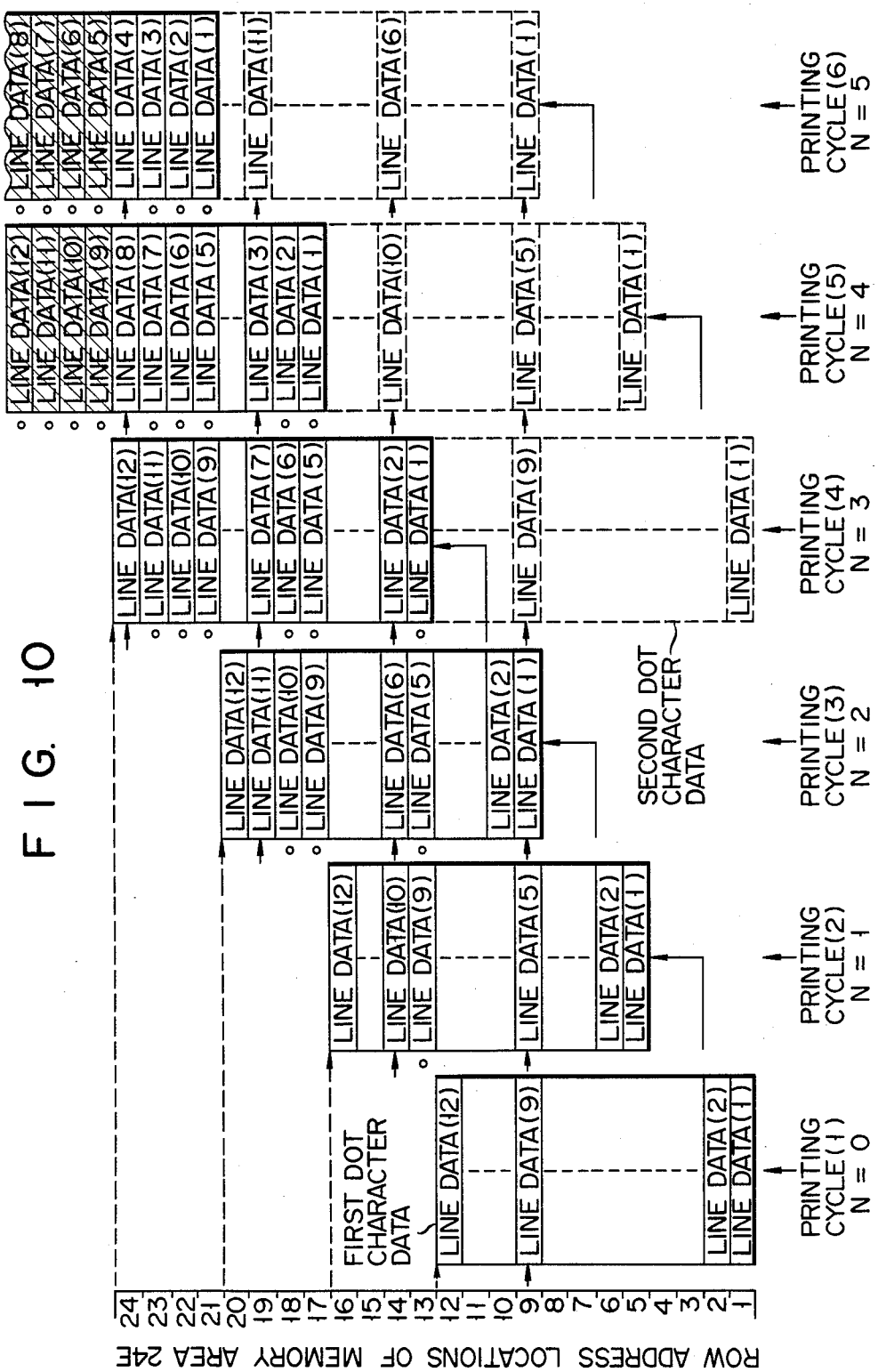
FIG. 10 illustrates the transfer of data in RAM shown in FIG. 7.

In the first printing cycle, the first dot character data is stored in the first to twelfth row address locations in image formation memory area 24E, as shown in FIG. 10. In FIG. 10, line data (1) to (5) correspond to five space-dot line data and line data (6) to (12) correspond to seven-character dot line data. In the first printing cycle, as shown by white-circle marks in FIG. 9A, dot line data DLD1, at the ninth row address location, indicated by an arrow in FIG. 10, is printed on recording paper 8 by electrode 11D.

In the second printing cycle, recording paper 8 is fed by distance DT in the sub-scanning direction with respect to head 4, and at the same time, the dot line data in the first to twelfth row address locations in memory area 24E are transferred to the fifth to sixteenth row address locations, as shown in FIG. 10. In this state, as shown by white-circle marks in FIG. 9B, dot line data DLD2 and CLD2, stored at the ninth and fourteenth row address locations, indicated by arrows in FIG. 10, are printed by electrodes 11D and 11C, respectively. In FIG. 9B, hatched-circle marks denote the dot line data printed in the preceding printing cycle. In this manner, line dot data DLD2, DLD1, and CLD2, at the fifth, ninth, and tenth row address locations (among the first to twelfth row address locations which were first stored into image formation memory area 24E) are printed. It should be noted that paper feed distance DT is set to be equal to n (=4)×PC (PC is the dot pitch between the centers of dots) and at the same time, P=DT+PC.

In the third printing cycle, recording paper 8 is further fed by distance DT and the dot line data in the fifth to sixteenth row address locations in memory area 24E, are transferred to the ninth to twentieth row address locations as shown in FIG. 10. In this state, as shown by white-circle marks in FIG. 9C, dot line data DLD3, CLD3, and BLD3 at the 9th, 14th, and 15th row address locations are printed by electrodes 11D, 11C, and 11B, respectively. These dot line data DLD3, CLD3, and BLD3 are the data which have been initially stored at the 1st, 6th, and 11th row address locations in image formation memory area 24E. In FIG. 9C, hatched-circle marks and black-circle marks represent the dot line data printed in the immediately preceding printing cycle and in the two or more cycles which were further previously effected, respectively.

Figure 9E:
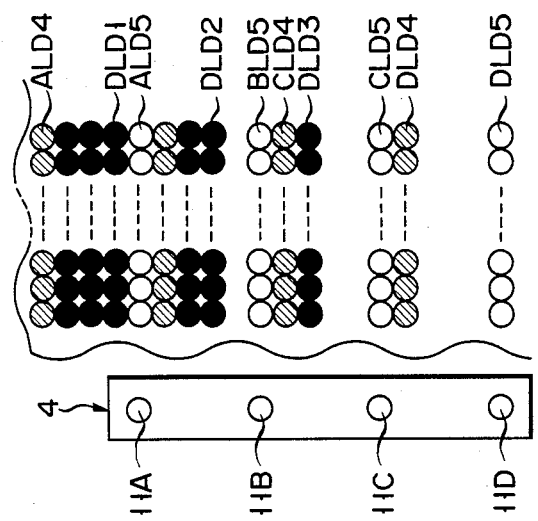
Figure 9D:
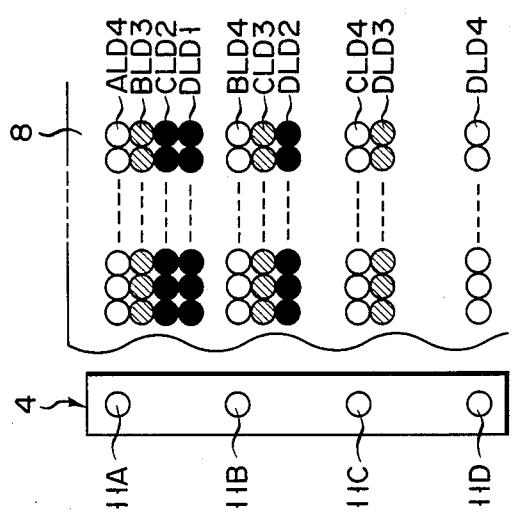

When the third printing cycle is finished, the first dot character data is transferred to the 13th to 24th row address locations in memory area 24E and N is set to "3". Therefore, step SP5 is executed and the second dot character data is written into the 1st to 12th row address locations in memory area 24E, as shown by broken lines in FIG. 10. Thereafter, the fourth printing cycle is executed. In the fourth printing cycle, as shown in FIG. 9D, dot line data DLD4, CLD4, BLD4, and ALD4 at the 9th, 14th, 19th, and 24th row address locations in memory area 24E, are printed by electrodes 11D, 11C, 11B, and 11A, respectively. Dot line data DLD4, CLD4, BLD4, and ALD4 are the dot line data at the ninth row location of the second dot character data and the dot line data at the 2nd, 7th, and 12th row locations of the first dot character data, respectively.

In the fifth printing cycle, as clearly shown in FIG. 10, the 17th to 24th row address locations in memory area 24E are assigned for the line dot data at the 1st to 8th row locations of the first dot character data. The 5th to 16th row address locations in memory area 24E are assigned for the line dot data at the 1st to 12th row locations of the second dot character data. In this case, the line dot data at the 9th to 12th row locations of the first character data is cleared. In this state, dot line data DLD5, CLD5, BLD5, and ALD5 at the 9th, 14th, 19th, and 24th row address locations in memory area 24E are printed, respectively. Dot line data DLD5, CLD5, BLD5, and ALD5 are the line dot data at the 5th and 10th row locations of the second dot character data and the line dot data at the 3rd and 8th row locations of the first dot character data, respectively.

In the sixth printing cycle, the dot line data at the 1st, 6th, and 11th row locations of the second dot character data, and the dot line data at the fourth row location of the first dot character data, are printed. In this manner, all of the first dot character data is printed in six printing cycles. At this time, M is equal to or larger than 5, and step SP1 is again executed.

In the embodiment, each dot character data is printed in six printing cycles. In the case where the lines of dot character data are continuously provided, the fourth to sixth printing cycles for the preceding dot character data, and the first to third printing cycles for the succeeding dot character data are simultaneously executed, respectively.

If NO in step SP5, the dot line data at the 2nd, 7th, and 12th row locations of the dot character data which is currently printed, the dot line data at the 3rd and 8th row locations, and the dot line data at the 4th row location, are sequentially printed in this order and the printing operation is finished.

In the above embodiment, when the dot pitch is PC, an interval P between printing elements is set to be equal to (n+1)PC (n is the number of printing elements) and at the same time, distance DT, to feed recording paper 8 in each printing cycle, is set to be equal to n×PC. Due to this, the printing elements can be linearly arranged, even in the ink jet printer, as well. Therefore, the width of the printing head can be reduced and the whole printer can be relatively small. In the case of color printing, the reduction in the width of the printing head, as mentioned above, is advantageous to the aim of miniaturizing the printer. Further, the dot pitch can be set sufficiently smaller than the distance between the printing elements. Therefore, the formation of a white or black line between two main scanning regions can be positively prevented, in the case where the dot lines are successively printed by activating all of the printing elements.

Although the present invention has been described above with respect to the preferred embodiment, the invention is not limited to only this embodiment. For example, although four printing elements have been used in the above embodiment, two, three, five, or more number of printing elements may be also used.

Further, the character data of two lines is stored in image formation memory area 24E in the embodiment; however, the character data of three or more lines may be stored and the selected dot line data of the character data of three or more lines can also be simultaneously printed.

In the preferred embodiment, five space-dot data is added to each seven-dot column of dot character data read out from character generator 22A, to form twelve-dot character data. However, it is possible to directly store the character data from character generator 22A in character memory area 24D, without adding five-space dot data to the dot character data. In this case, seven-dot character data is transferred from character memory area 24D, to the sixth to twelfth row address locations of image formation memory area 24E. It is also possible to store twelve-dot pattern data having twelve dots in each column into character memory area 24D and print the pattern data in the same manner.

Further, character data is transferred by four row address locations in each printing cycle. However, it is also possible to provide in RAM 24 an address designation memory area which is used to designate the row address locations of image formation memory area 24E. In this case, the dot character data stored in image formation memory area 24E is not shifted, and the row address locations designated by the address designation memory area are changed by "4" in each printing cycle.

What is claimed is:

1. A dot printing device comprising:
   a printing head having n printing elements arranged substantially in a line in a first direction, at regular intervals of P (=n×PC+PC) (PC is a dot pitch in the first direction), and serving to print dots onto recording paper with the dot pitch of PC in the first direction;

head driving means for driving said printing head in a second direction perpendicular to said first direction;

paper feed means for feeding said recording paper in the first direction by a predetermined distance DT ($=n \times PC$) for every printing cycle;

memory means including first to M-th row address locations to store M dot line data; and control means for selectively energizing said n printing elements, on the basis of the dot line data from predetermined n row address locations in said memory means, in each printing cycle and for shifting said M dot line data in said memory means by an amount of n row address locations, with respect to said first to M-th row address locations.

2. A dot printing device according to claim 1, wherein said printing head is an ink jet type printing head.

3. A dot printing device according to claim 2, wherein said M (M is an even number) dot line data constitute character data of two lines, and said control means has a first memory to store the M/2 dot line data constituting the character data of one line, and writes said M/2 dot line data in said first memory at the first to (M/2)-th row address locations in said memory means each time the dot line data in the memory means has been shifted by M/2 row address locations, with respect to said row address locations of said memory means.

4. A dot printing device according to claim 1, wherein said M (M is an even number) dot line data constitute character data of two lines, and said control means has a first memory to store the M/2 dot line data constituting the character data of one line and writes said M/2 dot line data in said first memory at the first to (M/2)-th row address locations in said memory means each time the dot line data in the memory means has been shifted by M/2 row address locations, with respect to said row address locations of said memory means.

5. A dot printing method comprising the steps of:

moving a printing head having n printing elements arranged substantially in a line in the first direction at regular intervals of P ($=n \times PC + PC$) (PC denotes the pitch of dots to be printed in the first direction) in the second direction perpendicular to the first direction, while selectively energizing those n printing elements in each printing cycle on the basis of the dot line data in predetermined n row address locations of a memory having first to M-th row address locations, in which M dot line data have been stored;

feeding recording paper by a distance DT ($=n \times PC$) along the first direction, with respect to the printing head, in each printing cycle; and shifting the M dot line data in one direction by the amount of n row address locations, with respect to the first to M-th row address locations, in each printing cycle.

6. A dot printing method according to claim 5, wherein the printing operation is started after all the dot line data constituting character or pattern data of one line are stored in said memory.

* * * * *